(12) United States Patent
Shin et al.

(10) Patent No.: US 6,731,342 B2
(45) Date of Patent: May 4, 2004

(54) DEINTERLACING APPARATUS AND METHOD USING EDGE DIRECTION DETECTION AND PIXEL INTERPLATION

(75) Inventors: Chang Yong Shin, Seoul (KR); Dong Il Han, Seoul (KR)

(73) Assignee: LG Electronics Inc., Seoul (KR)

( * ) Notice: Subject to any disclaimer, the term of this patent is extended or adjusted under 35 U.S.C. 154(b) by 295 days.

(21) Appl. No.: 09/754,358

(22) Filed: Jan. 5, 2001

(65) Prior Publication Data

US 2001/0008425 A1 Jul. 19, 2001

(30) Foreign Application Priority Data

Jan. 6, 2000 (KR) .............................. 2000/465
Jan. 13, 2000 (KR) ............................. 2000/1497

(51) Int. Cl.$^7$ ................................................ H04N 7/01
(52) U.S. Cl. ...................................... 348/452; 348/448
(58) Field of Search ................................. 348/452, 448, 348/700, 699, 625

(56) References Cited

U.S. PATENT DOCUMENTS 5,519,451 A * 5/1996 Clatanoff et al. ............ 348/606
5,631,706 A * 5/1997 Tsunashima ................. 348/452
5,796,437 A * 8/1998 Muraji et al. ................ 348/452
6,118,489 A * 9/2000 Han et al. .................... 348/452
6,181,382 B1 * 1/2001 Kieu et al. ................... 348/459
6,396,543 B1 * 5/2002 Shin et al. ................... 348/452
6,512,550 B1 * 1/2003 de Garrido et al. ......... 348/452

* cited by examiner

Primary Examiner—Victor R. Kostak
(74) Attorney, Agent, or Firm—Birch, Stewart, Kolasch & Birch, LLP

(57) ABSTRACT

The present invention relates to an interpolation technology, in particular to a deinterlacing apparatus and a method thereof which are capable of improving the definition of a picture. The method includes detecting an edge direction comprised in perimeter pixel values with inputs of a pixel value of field data in a field region to be interpolated and intra-field perimeter pixel values, detecting a direction indicating a minimum region matching error in accordance with the detected direction, yielding an intra-field interpolation value in accordance with the detected edge direction and performing an interpolation. This reduces the manufacture cost of a circuit by simplifying the circuit.

23 Claims, 9 Drawing Sheets

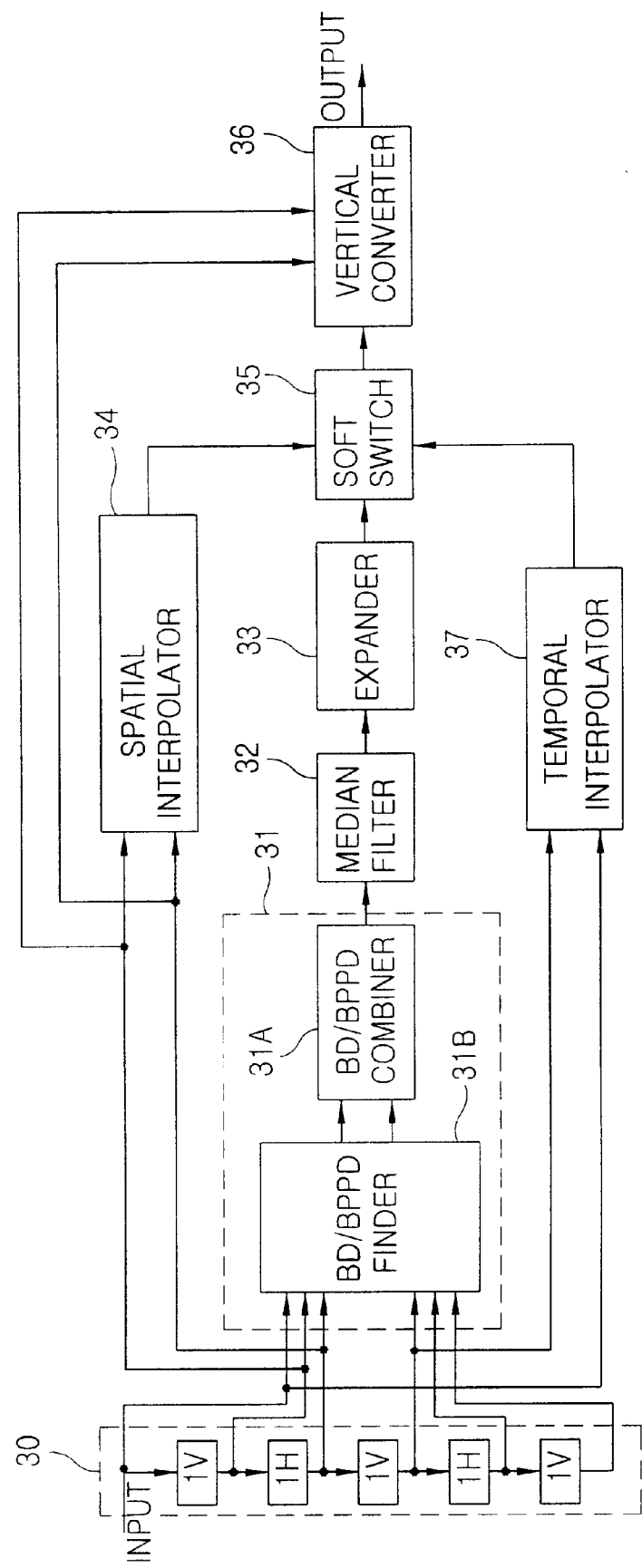

FIG. 4
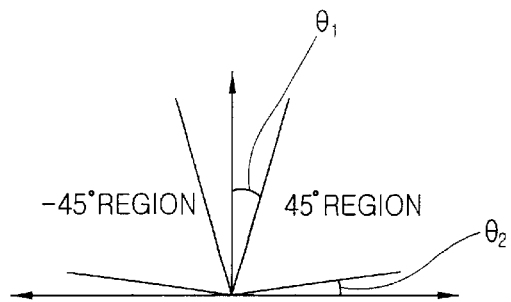
FIG. 5A
| X₁ | X₂ | X₃ |
|----|----|----|
| X₄ | X₅ | X₆ |
| X₇ | X₈ | X₉ |
FIG. 5B
| -1 | -2 | -1 |
|----|----|----|
| 0  | 0  | 0  |
| 1  | 2  | 1  |
FIG. 5C
| -1 | 0 | 1 |
|----|---|---|
| -2 | 0 | 2 |
| 1  | 0 | 1 |
FIG. 6
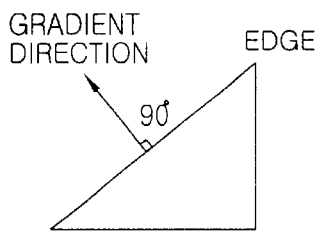

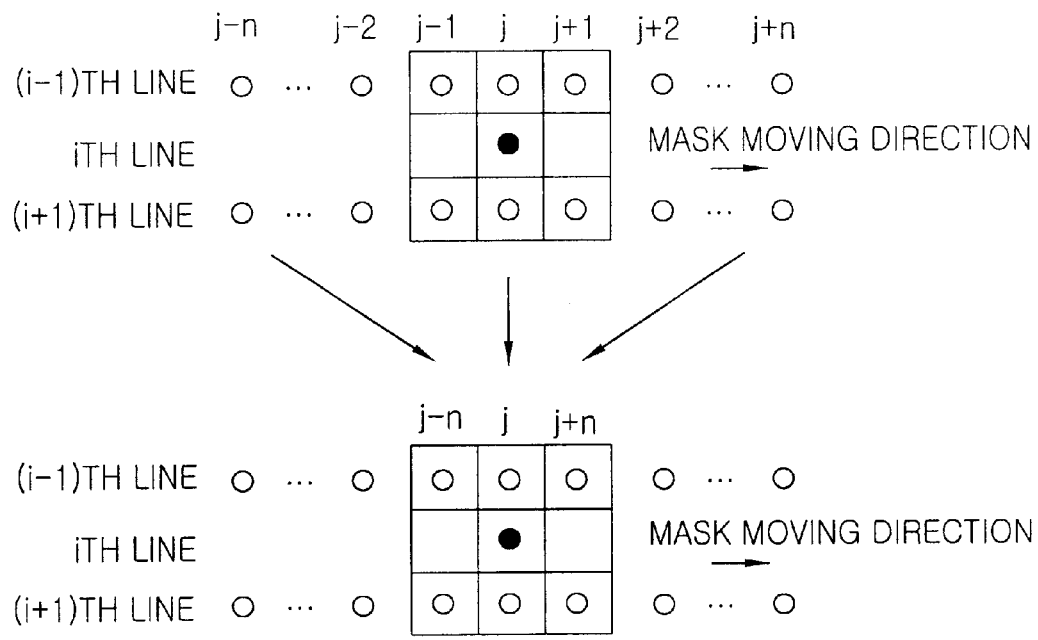

DEINTERLACING APPARATUS AND METHOD USING EDGE DIRECTION DETECTION AND PIXEL INTERPLATION

BACKGROUND OF THE INVENTION

1. Field of the Invention

The present invention relates to an interpolation technology adapted to a picture motion, in particular to a deinterlacing apparatus and a method thereof which are capable of improving definition of a picture by performing edge direction detection and pixel interpolation.

2. Description of the Background Art

In the conventional image processing method, a deinterlacing method is a method converting an interlaced scanning type image signal into a progressive scanning type image signal. It will now be described with reference to accompanying FIGS. 1 and 2A~2C.

FIG. 1 illustrates a picture in accordance with the general interlacing method.

As depicted in FIG. 1, in the interlaced scanning type image data, a picture of one frame is implemented with an odd field and an even field, namely, two fields.

However, according to a type of a display apparatus, a picture is implemented by processing the interlaced scanning type image signal as a progressive scanning type image signal used in a computer monitor etc. without processing it as the interlaced scanning type image signal.

Herein, in order to process the interlaced scanning type image signal on a display apparatus for processing the progressive scanning type image signal, an additional system for converting the interlaced scanning type image signal into the progressive scanning type image signal has to be installed inside of the display apparatus.

As depicted in FIGS. 2A~2C, a converting method for converting the interlaced scanning type image signal into the progressive scanning type image signal can be implemented in many ways.

FIG. 2A illustrates a line repetition in accordance with the conventional technology.

As depicted in FIG. 2A, the line repetition implements one frame by repeating line information of the present field.

FIG. 2B illustrates an intra-field interpolation without motion-compensation in accordance with the conventional technology.

As depicted in FIG. 2B, the intra-field interpolation without motion-compensation implements one frame by inserting a former field line between the present field line.

FIG. 2C illustrates an intra-field interpolation in accordance with the conventional technology.

As depicted in FIG. 2C, the intra-field interpolation implements a new field by inserting ½ divided data of two lines into region between the two lines on one field.

The line repetition can be implemented as a simple hardware, however the image quality lowers after the interpolation using the line repetition method.

In addition, the intra-field interpolation without motion-compensation also can be implemented as a simple hardware, however a picture is deteriorated due to an error occurred in the interpolation of a motion picture.

And, the intra-field interpolation is better than the line repetition in the image quality and error occurrence aspect, however the picture is deteriorated when a still picture is interpolated.

In other words, as depicted in FIGS. 2A~2C, the interpolation methods all have the image quality lowering problem after the interpolation.

Accordingly, a motion-compensation interpolation for interpolating the present picture by using field data of the former picture and field data of a picture to be implemented is suggested.

The motion-compensation interpolation divides a picture into a plurality of blocks and finds a motion vector about each block by using timely consecutive field data on the basis of the present field data, and interpolates the present frame picture by referring to the motion vector.

An image quality can be improved by the motion-compensation interpolation, however, it is implemented as a complicated hardware.

Accordingly, in order to solve the problem of the motion-compensation interpolation, a motion adaptive interpolation for interpolating a frame in accordance with a motion by assuming the degree of the motion is suggested.

The motion adaptive interpolation can be implemented as a simple hardware on the comparison with the motion-compensation interpolation, and it can improve the image quality after the interpolation.

The motion adaptive interpolation comprises a Bernard method represented in U.S. Pat. No. 5,027,201 and a Faroundja method represented in U.S. Pat. No. 5,159,451.

As described above, the conventional line repetition can be implemented as a simple hardware, however it lowers the image quality after the interpolation.

In addition, the conventional intra-field interpolation method can be implemented as a simple hardware also, however it has an error occurrence problem in the interpolation of the picture having the motion or image quality lowering problem due to the deterioration.

In addition, the conventional intra-field interpolation is better than the line repetition in the image quality and error occurrence aspect, however the picture is deteriorated when a still picture is interpolated.

The conventional motion adaptive interpolation can be implemented as a simple hardware on the comparison with the motion-compensation interpolation, and it can improve the image quality after the interpolation. However, a stepped noise occurs due to a simple vertical interpolation in an edge having a big motion.

In addition, the conventional motion adaptive interpolation uses a plurality of field memories and has a complicated processing process. Accordingly manufacture cost of an implementation circuit increases.

SUMMARY OF THE INVENTION

An object of the present invention is to provide a deinterlacing apparatus and a method thereof which are capable of improving the definition of a picture by performing interpolation appropriately in accordance with a motion degree and an edge direction of a field to be interpolated.

Another object of the present invention is to provide a deinterlacing apparatus and a method thereof which are capable of reducing the manufacture cost of a circuit to be implemented by simplifying the circuit.

Another object of the present invention is to provide a deinterlacing apparatus and method which overcome the limitations and disadvantages of the related art.

In order to achieve the above-described and other objects of the present invention, the deinerlacing apparatus in accordance with the present invention comprises a motion determining unit for mapping field data in a field region to be interpolated and perimeter field data around of it and detecting a BD (Brightness Difference) and a BPPD (Brightness Profile Pattern Difference) in order to yield a motion degree of a picture, a temporal interpolator for yielding a field average value about a field picture to be interpolated by averaging a pixel value of the former field and a pixel value of the after field, a spatial interpolator for detecting an edge direction comprised in the perimeter pixel values with inputs of the pixel value of the former field and after field about the field picture to :be interpolated, detecting a direction indicating a minimum region matching error in accordance with the detected edge direction, and yielding the intra-field interpolation value in accordance with the detected direction, and a soft switch unit for mixing the yielded intra-field interpolation value and the yielded field average value in accordance with the BD (Brightness Difference) and BPPD (Brightness Profile Pattern Difference), and outputting it to a vertical converter.

In order to achieve above-described and other objects, a deinterlacing method in accordance with the present invention for interpolating the present field d a t a by yielding a correlation between pixels in a certain region including a pixel to be interpolated in M number of field data and yielding an interpolation value of the pixel to be interpolated, comprises a sub-sampling process for performing a sub-sampling of perimeter pixels in a certain region centering around a pixel to be interpolated when the pixel to be interpolated does not exist on a horizontal or a vertical edge, a detecting process for detecting a varying direction of the pixel to be interpolated in the pixel region where the sub-sampling is performed, and a yielding process for yielding an interpolation value by referring to the detected direction.

In order to achieve above-described and other objects, a deinterlacing method in accordance with the present invention for detecting a motion degree by using a BD and BPPD of a picture in order to interpolate the picture by referring to the motion degree, comprises a pixel detecting process for detecting pixels in a certain region including a pixel to be interpolated in M number of field data corresponding to an interlaced scanning type picture, a varying direction detecting process for detecting a varying direction of the pixel to be interpolated by yielding a correlation between pixels in the certain region, a yielding process for yielding a region matching error of each region after dividing an observation window when the pixel to be interpolated does not exist on the horizontal or vertical edge in the certain region, and a yielding process for yielding an interpolation value to a direction indicating a minimum region matching error among the yielded errors of each region.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus are not limitative of the present invention and wherein:

FIG. 3 is a block diagram illustrating a deinterlacing apparatus in accordance with an embodiment of the preset invention.

FIG. 4 illustrates a region division for mapping an edge portion in accordance with an embodiment of the present invention.

FIG. 5A illustrates a picture region corresponding to 3×3 size of a sobel mask for finding variation value about direction of a pixel value in accordance with an embodiment of the present invention.

FIG. 5B illustrates a sobel mask for finding y axial direction variation value of a pixel value in accordance with an embodiment of the present invention.

FIG. 5C illustrates a sobel mask for finding x axial direction variation value of a pixel value in accordance with an embodiment of the present invention.

FIG. 6 illustrates relation between an edge direction and a gradient direction in accordance with an embodiment of the present invention, FIG. 7 illustrates a sub-sampling method for detecting optical angle edge in accordance with an embodiment of the present invention.

FIG. 8A illustrates a pixel to be interpolated and perimeter pixels in accordance with an embodiment of the present invention.

FIG. 8B illustrates a two-dimension gaussian filter for removing a noise element in accordance with an embodiment of the present invention.

DETAILED DESCRIPTION OF THE PREFERRED EMBODIMENTS

Figure 1:
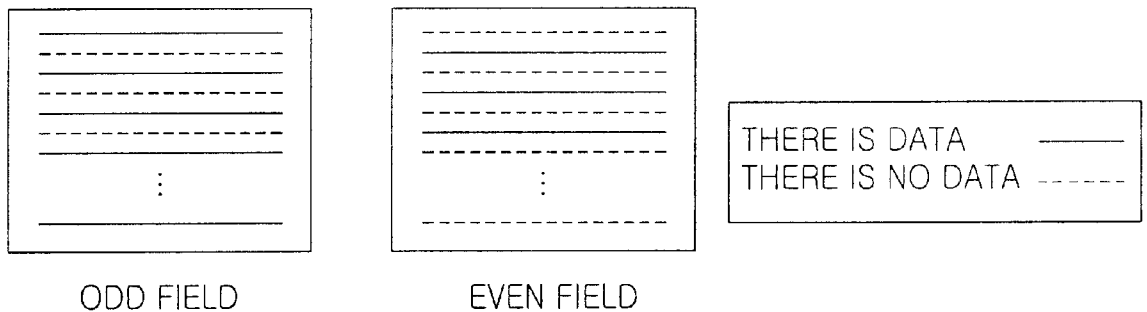
FIG. 1 illustrates a picture in accordance with the general interlacing method.
Figure 2A:
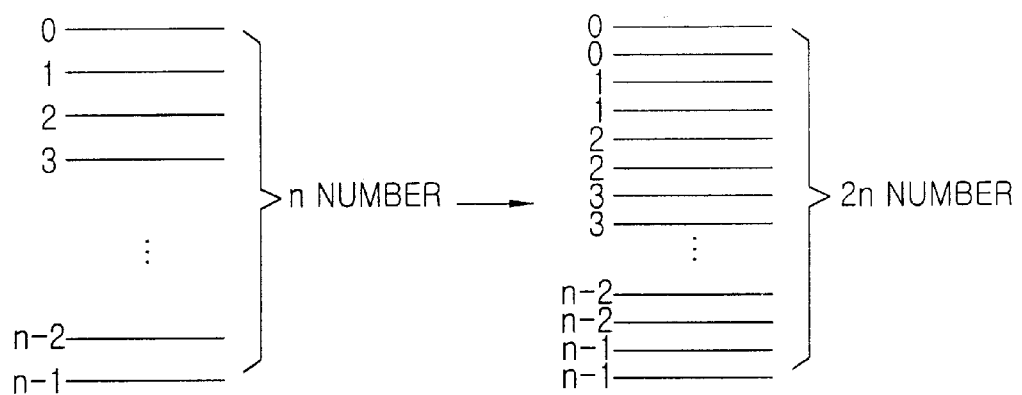
FIG. 2A illustrates a line repetition in accordance with the conventional technology.
Figure 2B:
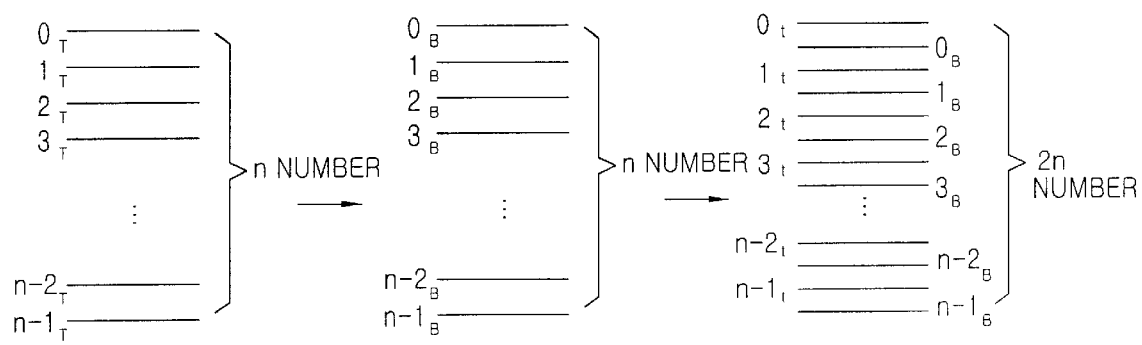
FIG. 2B illustrates an intra-field interpolation without motion-compensation in accordance with the conventional technology.
Figure 2C:
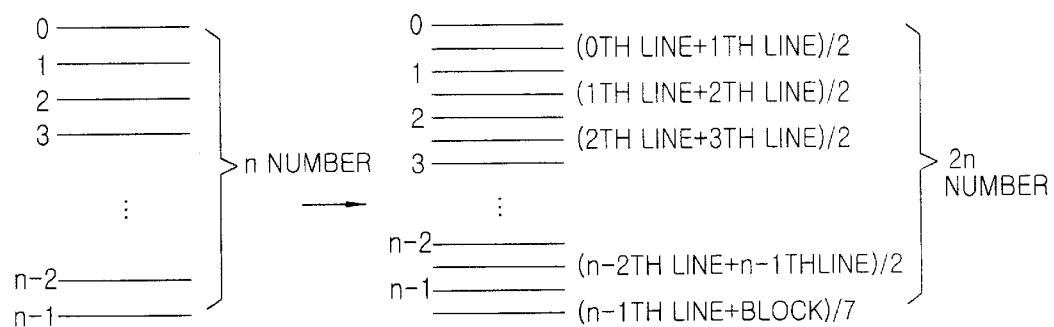
FIG. 2C illustrates an intra-field interpolation in accordance with the conventional technology.

FIG. 3 is a block diagram illustrating a deinterlacing apparatus in accordance with an embodiment of the preset invention.

As depicted in FIG. 3, the deinterlacing apparatus in accordance with the present invention comprises a field storing unit 30 for storing timely consecutive preset field data, former two sheet field data and next four sheet field data, a motion determining unit 31 for yielding BD (Brightness Difference) and BPPD (Brightness Profile Pattern Difference) in the field storing unit 30, mapping it with a preset value when the BD and BPPD are greater than a certain threshold, and yielding a motion degree value by referring to the BD and BPPD, a median filter 32 for grouping a region where the motion degree value is by removing the noise element included in the motion degree value, an expander 33 for diffusing the motion degree value into the perimeter pixels with the input of the filter value of the median filter 32, a spatial interpolator 34 for yielding the intra-field interpolation value in accordance with the direction by yielding an edge direction included in the pixel value around the pixel to be interpolated with the input of the pixel value of the field data in the preset interpolated region from the filter storing unit 30 and intra-field perimeter pixel value, a temporal interpolator 37 for yielding a field average value by averaging the former field pixel value and the after field pixel value about the preset interpolated field picture, a soft switch 35 for mixing the intra-field interpolation value considering the edge direction of the spatial interpolator 34 and the field average value of the temporal interpolator 37 by referring to the BD and BPPD on the expander 33, and a vertical converter 36 for converting a number of vertical lines by referring to the interpolation line data on the soft switch 35 with the input of the present field data in the field storing unit 30.

The motion determining unit 31 comprises a BD/BPPD finder 31B for yielding BP and BPPD in the former field and the after field by detecting the BD and BPPD of the each field data in the field storing unit 30 centering around the present field, and a BD/BPPD combiner 31A for determining a motion degree value by mapping them with the preset value when the BD and BPPD are greater than the preset threshold value.

The operation and operation effect of the present apparatus will now be described in detail.

First, the field storing unit 30 stores picture data corresponding to timely consecutive M number of fields such as nth picture data and former field and after field, etc. centering around the preset field, namely, nth field among a plurality of field data for implementing an output picture.

In other words, the field storing unit 30 stores the former and after field data including the nth field data, and provides the stored field data to the motion determining unit 31, spatial interpolator 34, and temporal interpolator 37.

Herein, the motion determining unit 31 calculates the motion degree of the moving picture by detecting a pixel value and the BPPD of a certain line existed between each field data stored in the field storing unit 30.

In other words, the motion determining unit 31 can determine the motion degree value by using the BD/BPPD finder 31B for detecting the BD and BPPD of each field data in the field storing unit 30, comparing the BD and BPPD of the former field and after field centering around the present field and yielding the BD and BPPD, and by using the BD/BPPD combiner 31A for inputting the yielded BD and BPPD.

When the BD and BPPD are separately greater than the preset threshold value, the BD/BPPD combiner 31A maps the BD and BPPD with the preset value, and determines the motion degree value.

Herein, the BD concept is used in a picture processing field such as a digital television etc. in order to perform the line interpolation, the BPPD concept is represented in Korea patent No. 97-80719 patented by the inventor of the present invention.

In Korea patent No. 97-80719 by the inventor of the present invention, quantization of the BPPD for yielding the BD and BPPD performs the line interpolation about a certain plurality of lines in accordance with application.

For example, the yielding process for yielding the BD and BPPD on the motion determining unit 31 by assuming timely consecutive n−2, n−1, n, n+1 four field data will now be described in detail.

First, the BPPD of the n−2th field data is extracted by using the pixel value of the n−2th field data. In other words, the BPPD on the n−2th field input time is extracted.

And, the BPPD of the nth field data is extracted by using the pixel value of the nth field data. In other words, the BPPD on the nth field input time is extracted.

After that, the motion determining unit 31 yields the BPPD of the n−2th field and nth field by comparing the n−2th field BPPD and nth field BPPD. In addition, the BD of the n−2th field and nth field is yielded.

In addition, the motion determining unit 31 yields the BP and BPPD of the n−1th field and n+1 field with the process same as the above-described process.

However, a noise may be mixed inevitably in a picture transmitted through a broadcasting channel etc. in a coding process or a transmission process.

Accordingly, in the present invention, the motion determining unit 31 comprises the median filter 32 for removing the noise-element in the output value of the BD/BPPD combiner 31A and grouping the motion detected region among the pictures, and the expander 33 for expanding the motion degree value to the other pixel adjacent to the pixel having the motion with the input of the output value on the median filter 32 in order to set the output value of the BD/BPPD combiner 31A accurately.

Herein, the expander 33 expands the motion degree value to the adjacent pixel, and the reason for the expansion will now be described.

In general, the motion of the moving picture is not only present on a certain pixel, but also on pixel groups on a certain region.

Accordingly, when the motion degree value of the certain pixel is detected, it is because the noise element of the pixel or the certain pixel and adjacent perimeter pixel are in motion state.

Herein, the motion degree value corresponding to the noise element is removed already on the median filter 32, and accordingly there is a high possibility that the perimeter pixels are in motion state.

Accordingly, the expander 33 expands the motion degree value outputted from the median filter 32 to the perimeter of the pixel which is detected with the motion degree value.

Meanwhile, the spatial interpolator 34 detects the pixel value of the nth field data corresponding to the region to be line-interpolated and the intra-field perimeter pixels with the input of the field data in the region to be interpolated from the field storing unit 30, yields an edge direction including the pixel values around the pixel to be interpolated by using the correlation of the intra-field pixels, and extracts an appropriate interpolation value in accordance with the edge direction.

In particular, the spatial interpolator 34 in accordance with the present invention extracts the pixel value of the pixels spatially adjacent from the pixel to be interpolated, the pixel value of the field timely adjacent for the present field of the pixel to be interpolated, the interpolation value of the pixel to be interpolated by filtering in order to maintain spatial consistency and timely consistency of the pixel to be interpolated, and it adapts an edge direction detecting method using a gradient and a rule and a region matching method.

Because the operation theories of the edge direction detecting method using a gradient and a rule and the region matching method are described in detail in Korea patent No. 99-26084 by the inventor of the present invention, the present application will describe it briefly.

First, the spatial interpolator 34 detects the edge direction by using the correlation of the intra-field pixels.

Herein, a whole region will now be described in detail with reference to FIG. 4 in order to detect the edge direction of the pixel to be interpolated.

FIG. 4 illustrates a region division for mapping the edge portion in accordance with the embodiment of the present invention.

As depicted in FIG. 4, it is assumed the whole region is divided into three directions such as −45°, 0°, 45°. The spatial interpolator 34 finds the correlation about pixels adjacent upper, lower, left, right centering around the pixel to be interpolated in order to judge where the pixel to be interpolated is included among the three directions, and judges whether the pixel to be interpolated is included in a vertical or horizontal edge.

For example, when the jth pixel on the ith line is interpolated, the correlation about the vertical direction between the pixel to be interpolated and adjacent pixel can be found by a below equation.

$$\left| \frac{(p(i-1, j-2, n) + 2p(i-1, j-1, n) + p(i-1, j, n))}{4} - \frac{(p(i+1, j-2, n) + 2p(i+1, j-1, n) + p(i+1, j, n))}{4} \right| = a \quad \text{[Equation 1]}$$

$$\left| \frac{(p(i-1, j-1, n) + 2p(i-1, j, n) + p(i-1, j+1, n))}{4} - \frac{(p(i+1, j-1, n) + 2p(i+1, j, n) + p(i+1, j+1, n))}{4} \right| = b \quad \text{[Equation 2]}$$

$$\left| \frac{(p(i-1, j, n) + 2p(i-1, j+1, n) + p(i-1, j+2, n))}{4} - \frac{(p(i+1, j, n) + 2p(i+1, j+1, n) + p(i+1, j+2, n))}{4} \right| = c \quad \text{[Equation 3]}$$

After that, the spatial interpolator 34 yields the edge; direction or the pixel to be interpolated by performing the process same as the below program.

IF (max {a,b,c}<theshold)THEN
   edge direction=0°
ELSE
   edge direction detection by a gradient
ENDIF Herein, the pixel to be interpolated is p (i,j,n), which means a pixel placed on i row, j column of nth field.

The same meaning can be adapted to p(i,j,n) used in Equations 1–3 above.

In other words, the spatial interpolator 34 yields a maximum value (max (a, b, c)) of the difference value (a,b,c) between low-pass-filtered pixels found by the Equations 1–3, and judges the edge direction of the pixel to be interpolated as 0° when the maximum value (max (a,b,c)) is smaller than a certain threshold.

In addition, the edge direction of the pixel to be interpolated is judged as 0°, when the horizontal direction correlation about the low-pass-filtered pixel is detected by the similar method with the vertical direction correlation detecting method and the yielded value is smaller than the certain threshold of the horizontal direction.

On the contrary, when the maximum value (max (a,b,c)) of the difference value between low-pass-filtered pixels is the same as a certain threshold or larger, in other words, when the pixel to be interpolated exists in the region showing the low correlation to the vertical or horizontal direction, the spatial interpolator 34 detects the edge direction by using the edge direction detecting method using a gradient and a rule.

In other words, the pixel to be interpolated is not included in the vertical or horizontal edge. Accordingly, the process for yielding the edge direction including the pixel to be interpolated will now be described with reference to accompanying FIGS. 5A~5C.

FIG. 5A illustrates a picture region corresponding to 3×3 size of a sobel mask for finding variation value about the direction of a pixel value in accordance with an embodiment of the present invention.

As depicted in FIG. 5A, the gradient of the pixel value is found by using the 3×3 size sobel mask.

FIG. 5B illustrates a sobel mask for finding the y axial direction variation value of a pixel value in accordance with an embodiment of the present invention.

As depicted in FIG. 5B, the 3×3 size sobel mask for finding the y axial gradient on a pixel (x5) is described.

FIG. 5C illustrates a sobel mask for finding the x axial direction variation value of a pixel value in accordance with an embodiment of the present invention.

As depicted in FIG. 5C, the 3×3 size sobel mask for finding the x axial gradient on a pixel (x5) is described.

Herein, the gradient of the pixel value is found by substituting the pixel value inside of the sobel mask of FIGS. 5A~C into below Equations 4 and 5.

$$\vec{G}[P_{y,x}] = \begin{pmatrix} G_x \\ G_y \end{pmatrix} = \begin{pmatrix} \frac{\partial p}{\partial x} \\ \frac{\partial p}{\partial y} \end{pmatrix} \quad \text{[Equation 4]}$$

$$\alpha(y, x) = \tan^{-1}\left[\frac{G_y}{G_x}\right] \quad \text{[Equation 5]}$$

Herein, α is an angle measured corresponding to a x axial.

Accordingly, direction of the gradient will now be described with reference to accompanying FIG. 6.

FIG. 6 illustrates the relation between the edge direction and gradient direction in accordance an embodiment of the present invention.

As depicted in FIG. 6, the gradient direction is vertical to the edge direction ($a_e$ (y,x)), and the edge direction ($a_e$ (y,x)) can be found by using below Equation 6.

$$a_e\ (y,x) \geq 0,\ 90-a\ (y,x)$$

$$a_e\ (y,x) < 0,\ -90-a\ (y,x) \qquad \text{[Equation 6]}$$

According to this, the spatial interpolator 34 judges whether the edge direction detected by the gradient belongs to 0°.

Herein, when the edge direction in accordance with the operation result is judged as 0°, the process for judging whether the pixel to be interpolated exists on the edge of more wide range will now be described in detail with reference to accompanying FIG. 7.

FIG. 7 illustrates a sub-sampling method for detecting an optical angle edge in accordance with an embodiment of the present invention.

As depicted in FIG. 7, a sobel mask is found by performing the sub-sampling about j−n~j+n column centering around the pixel to be interpolated.

Herein, in order to prevent aliasing of frequency wide band, the sub-sampling is performed after limiting as request frequency wide band by performing the low pass filtering.

After that, the spatial interpolator 34 performs the Equation 1~3 operation about the sobel mask, compares the maximum value (max (a, b, c)) of the difference value (a, b, c) between the pixels with the threshold, and judges whether the pixel to be interpolated exists on the horizontal or vertical edge.

According to this, in the judging result about the sub-sampling pixel, when the pixel to be interpolated exists on the horizontal or vertical edge, the spatial interpolator 34 judges the edge direction of the pixel to be interpolated as 0°.

On the contrary, when the pixel to be interpolated does, not exist on the horizontal or vertical edge, the spatial interpolator 34 yields the edge direction by performing the Equation 4~6 operation.

And, when the edge direction is detected by the gradient, an initial assumption pixel value of a line to be interpolated is a value interpolated linearly to a vertical direction or a value adapting two dimension gaussian filter to the linearly interpolated value is used. It will now be described in detail with reference to accompanying FIGS. 8A and 8B.

FIG. 8A illustrates a pixel to be interpolated and perimeter pixels in accordance with an embodiment of the present invention. In other words, it describes 3×3 picture region of Interlaced scanning field picture.

FIG. 8B illustrates a two-dimension gaussian filter for removing a noise element in accordance with an embodiment of the present invention.

As depicted in FIGS. 8A and 8B, the initial assumption pixel value linearly interpolated on x in the picture region as shown in FIG. 8A to the vertical direction is $$\frac{b+e}{2}.$$

In addition, the initial assumption pixel value on x after passing the two dimension gaussian filter in FIG. 8B is $$\frac{(a+2b+c+d+2e+f)}{8}.$$

Accordingly, the spatial interpolator 34 performs the above-described process in accordance with a below program.

```
IF (Exist on horizontal or vertical edge) THEN
    Edge direction=0°
ELSE
    Detect edge direction by the gradient calculation
    IF (edge direction=0°) THEN
    Perform the sub-sampling centering around the present
        pixel to be interpolated
    IF (Exist on horizontal or vertical edge) THEN
        Edge direction=0°
    ELSE
        Detect edge direction by the gradient calculation
    ENDIF
    ENDIF
ENDIF
```

In other words, when the pixel to be interpolated exists on the horizontal or vertical edge after detecting the correlation between the pixel to be interpolated and perimeter pixels, the edge direction is judged as 0°.

Meanwhile, when the edge direction of the pixel to be interpolated is not 0°, the edge direction is yielded by adapting the edge direction detecting method using a gradient, and it is judged whether the edge direction is 0°.

Herein, when the edge direction is judged as 0°, the sub-sampling is performed centering around the pixel to be interpolated. It is judged whether the pixel to be interpolated exists on the horizontal or vertical edge by using Equations 1~3.

According to this, when the pixel to be interpolated exists on the horizontal or vertical edge, the edge direction of the pixel to be interpolated is judged as 0° finally.

On the contrary, after the sub-sampling of the pixel, when the pixel to be interpolated does not exist on the horizontal or vertical edge, the edge direction is yielded by adapting the edge direction detecting method using the gradient about the sub-sampling pixel.

After that, Dir(j+1), Dir(j+2), Dir(j+3), dir(j+4), . . . of the direction value of each pixel are yielded continually by performing the above-described process repeatedly about the pixel placed on j+1, j+2, j+3, j+4, . . . .

In addition, when the edge direction of the pixel to be interpolated is detected in accordance with the above-described process, the spatial interpolator 34 interpolates the initial edge direction wrongfully detected due to the noise element by using an "edge detecting method using hierarchical rule" and comparing-analyzing it with the edge directions belonging the perimeter pixels. It will now be described in more detail with reference to accompanying FIG. 9.

Figure 9:
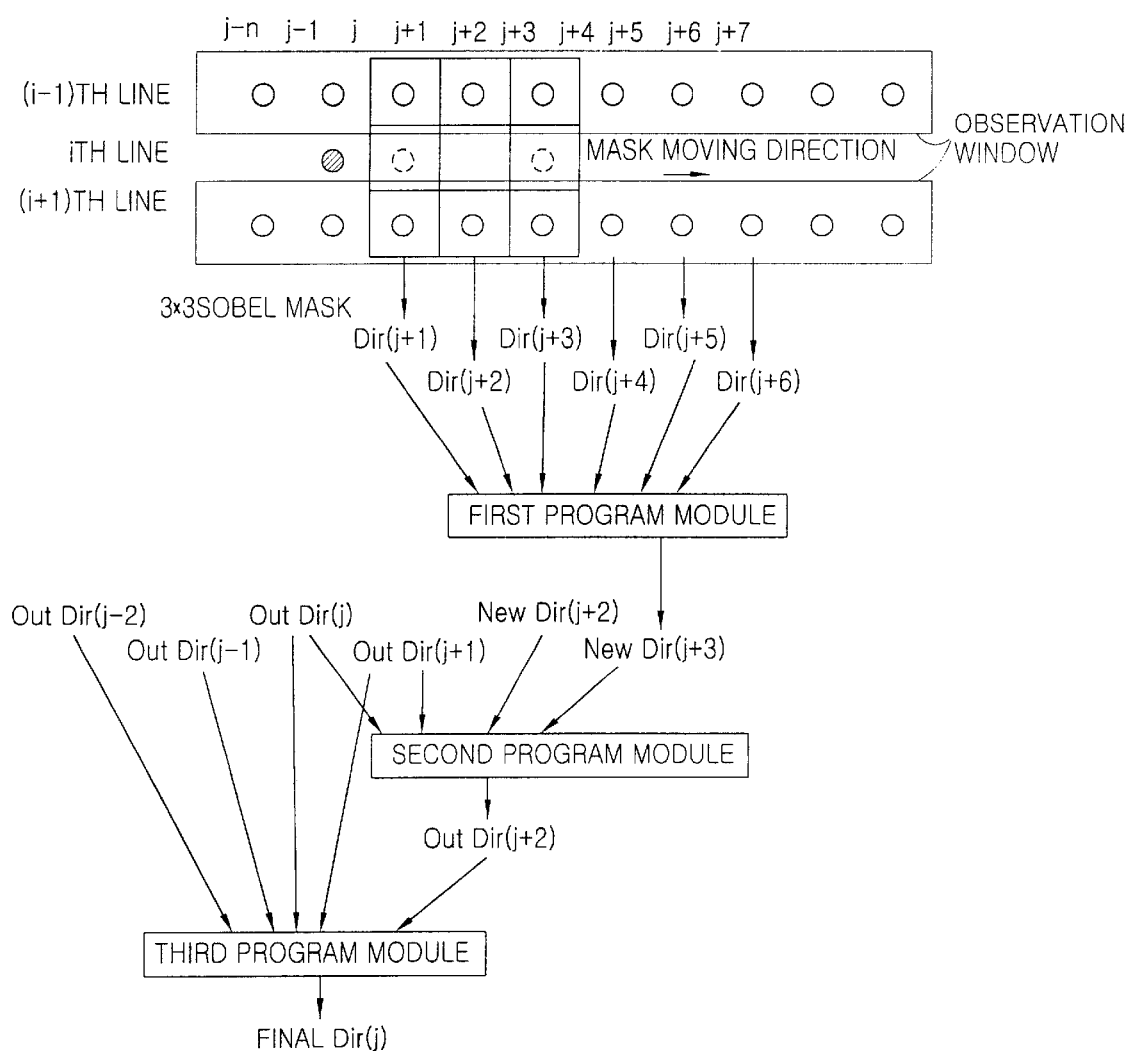
FIG. 9 illustrates an edge direction detecting method on the basis of a gradient and a hierarchical rule in accordance an the embodiment of the present invention.

FIG. 9 illustrates an edge direction detecting method on the basis of a gradient and a hierarchical rule in accordance with an embodiment of the present invention.

As depicted in FIG. 9, the direction values (NewDir(j+3)) of the pixel placed adjacent to the pixel to be yielded the original direction value to the horizontal direction is assumed by performing the operation process of the first program module by referring to the direction values Dir(j+1), Dir(j+2), Dir(j+3), Dir(j+4), . . . of each pixel.

In addition, the direction value (NewDir(j+2)) of the adjacent pixel is assumed with the same method by substituting j into j−1.

After that, the direction value (OutDir(j+2)) of the after adjacent pixel is yielded by performing the operation process of the second program module by using the yielded direction values (NewDir(j+2)), NewDir(j+3)), the pixel to be found, the present direction value and the direction values (OutDir(j), OutDir(j+1)) of the former pixel.

According to this, the edge direction (FinalDir(j)) of the pixel to be interpolated is compensated to the right direction by performing an operation process of a third program module by using the direction value (Outdir(j+2)) of the adjacent pixel, the present pixel to be found, the present direction value, and the direction values (Outdir(j−2), OutDir(j−1), OutDir(j), OutDir(j+1)) of the former and after pixels.

After that, the region matching method is adapted in order to yield an interpolation value of the pixel to be interpolated by detecting more detailed edge direction and linear-interpolating the perimeter pixel values about the edge direction (FinalDir(j)) determined macroscopic as described above.

The region matching method extracts the interpolation value by using a character the pixel value in the region to be interpolated is consecutive in accordance with the edge direction. It will now be described in detail.

First, the pixel value existed in a sliding window on a certain edge including a pixel to be interpolated is detected.

Herein, the volume of the sliding window can be adjusted in accordance with a system.

And, while the sliding windows placed up and down are shifted to the opposite direction from each other with a certain interval, the difference between the pixels corresponding to each other in the up and down sliding windows is continually detected about various edge directions in the shifted interval.

At the same time, the edge direction including the pixel to be interpolated is detected by referring continually to the detected variation of the pixel value. It will now be described in detail with reference to accompanying FIG. 10.

Figure 10:
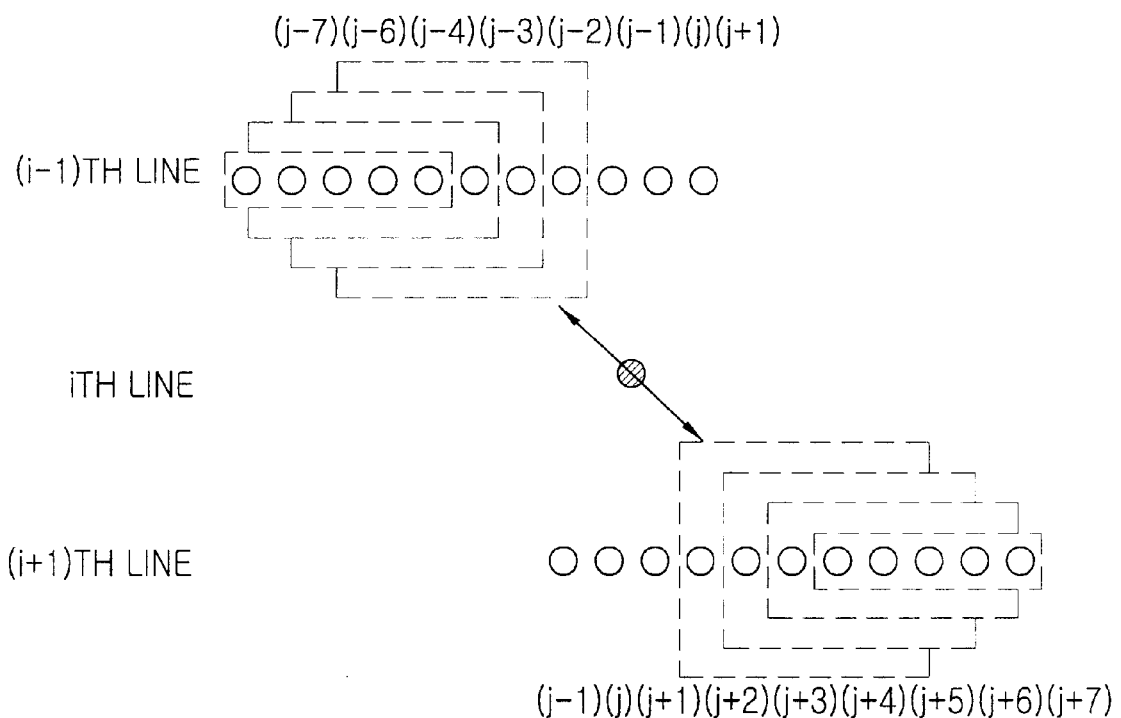
FIG. 10 illustrates a region matching method for detecting an interpolation direction in accordance with an embodiment of the present invention.

FIG. 10 illustrates the region matching method for detecting the interpolation direction in accordance with an embodiment of the present invention.

As depicted in FIG. 10, when the macroscopic edge direction (FinalDir(j)) determined by the edge direction detecting method using the gradient and hierarchical rule is −45°, the region matching method for determining the detailed direction is described.

Accordingly, a certain sliding window is set on i+1th line and i−1th line in a regular observation window centering around ith line to be interpolated.

And, the sliding window on the i−1th line is moved left to right, and the sliding window on the i+1th line is moved right to left.

And, the variation of the pixel value is yielded by detecting the difference value of the pixels placed on a diagonal line from each other in the sliding windows and adding the difference or converting the added value into an average difference value per pixel in a certain sliding window.

Herein, the sliding interval of the sliding window is set a half of the adjacent pixel interval, however it is also possible to adjust the sliding interval of the sliding window with a detailed interval such as ¼, ⅛, . . . etc. in order to get more accurate variation.

Herein, the pixel value of the pixels adjacent each other horizontally in the observation window is linearly interpolated, and the linearly interpolated pixel value is set to a value between the pixels horizontally adjacent each other in the observation window.

After that, the difference of the pixel values of the pixel in the sliding window is yielded by a below Equation 7 or the average difference per the pixel dividing $Err_m$ of Equation 7 with the number of the pixels placed in the sliding window is yielded.

$$Err_m = \sum_{n=-\frac{k}{2}}^{\frac{k}{2}} |P_{i,j+m+n} - P_{i+2,j+n-m}| \quad \text{[Equation 7]}$$

Herein, m can be set to the direction of a diagonal line to be found in accordance with an application. For example, the range of m can be set from −3 to +3, and the interval of m value between −3 and +3 can be defined by the sliding interval of the sliding window.

After that, a minimum value is extracted among the values by Equation 7, and $m_{min}$ value about the minimum value is extracted. In other words, when the range of m is set from −3 to +3 and the sliding interval of the sliding window is defined as a half pixel, the interpolation value is yielded in accordance with $m_{min}$.

Hereinafter, the interpolation value yielding process by the region matching method will now described in detail.

First, the pixel value of each pixel comprised in the movement region can be found by linearly interpolating the pixels adjacent horizontally each other.

And, the interpolated pixel value is inserted between the pixels adjacent horizontally, and the difference between the pixels of the sliding regions is yielded and is added.

After that, the interpolation value is found by yielding the minimum value among the added values and linear-interpolating the pixel value existed on the center of the upper and lower sliding regions placed on the diagonal line where the minimum value is yielded.

Herein, when at least two $m_{min}$ are yielded among the values yielded by Equation 7, the interpolation value at the most closest point has priority by setting m as a datum point when m is 0.

In addition, when two $m_{min}$ are yielded at the point having the same distance from the datum point when m is 0, the interpolation value is yielded by filtering the pixel value placed on the center of the sliding windows where the two $m_{min}$ exist.

And, the volume of the observation window and the number of the pixels comprised in the observation window can be adjusted freely.

Also, the volume of the sliding window can be adjusted freely in the range of the observation window, and the number of the pixels comprised in the sliding window can be adjusted freely.

However, in the present invention, when the region matching method is adapted in detail according to the given edge direction, the region matching method is adapted to each region after dividing the region into a plurality of regions.

According to this, the minimum region matching error Min_Err of each region is found, and the pixel value placed on the pixel to be interpolated is interpolated in accordance with the direction indicating the minimum region matching error among the minimum region matching errors.

Figure 11:
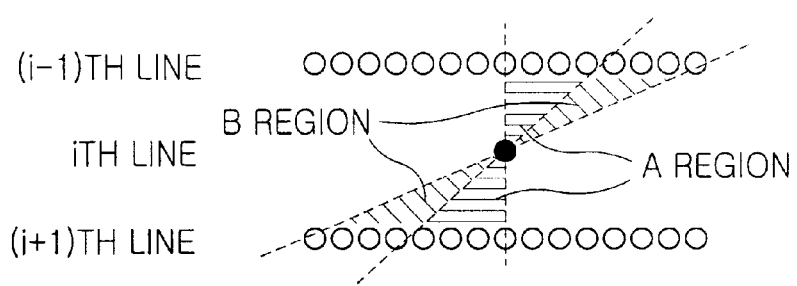
FIG. 11 illustrates an observation window division for a region matching method in accordance with an embodiment of the present invention.

FIG. 11 illustrates an observation window division for the region matching method in accordance with an embodiment of the present invention. In other words, when the macroscopic edge direction (FinalDir(j)) is 45°, the region matching method about each region after dividing largely into A, B region is described.

First, the A region is set to a certain edge direction in 45° region detected centering around the edge direction 0°, and the B region is set from the certain edge direction to the end of the region to be observed in the 45° direction.

In addition, the certain edge direction as the set region boundary can be selected freely in consideration of an application and volume of the sliding window etc.

Herein, the region matching error is found about each A, B region with the operation as Equation 7, the region matching errors about each A, B region are compared, and accordingly the minimum region matching error Min_Err$_A$, Min_Err$_B$ in each A, B region are found.

After that, the minimum region matching error Min_Err$_A$, Min_Err$_B$ in each A, B region are compared.

Herein, when the region matching error Min_Err$_A$ is smaller than or same as Min_Err$_B$, the present pixel value to be interpolated is the interpolated value in accordance with the direction showing the minimum region matching error Min_Err$_A$ of the A region.

On the contrary, when the region matching error Min_Err$_A$ is bigger than the region matching error Min_Err$_B$, the interpolated pixel value is found in accordance with the direction indicating the minimum region matching error Min_Err$_B$ of the B region, and it is judged whether it exists between the pixels on the upper and lower of the pixel to be interpolated.

According to this, when there is the value interpolated in accordance with the direction indicating minimum region matching error Min_Err$_B$ between the pixel values existed on upper and lower of the present pixel to be interpolated, the pixel value is the pixel value to be interpolated.

Meanwhile, when there is no pixel value interpolated in accordance with the direction indicating the minimum region matching error Min_Err$_B$ between the pixel values existed upper and lower of the pixel, the pixel value to be interpolated is the value interpolated according to the direction indicating the minimum region matching error (Min_Err$_A$) of the A region.

In other words, the above-described process is performed in accordance with a below program.

```
IF(Min_Err_A ≤ Min_Err_B) THEN
    P_I (i, j, n)=P_AI (i, j, n)
ELSE
    IF (Median {P(i-1, j, n), P_B1 (i, j, n), P(i+1, j, n)}=P_BI
        (i, j, n)) THEN
        P_I (i, j, n)=P_B1 (i, j, n)
    ELSE
        P_I (i, j, n)=P_AI (i, j, n)
    ENDIF
ENDIF
```

Herein, P$_I$ (i, j, n) describes a pixel placed on i row, j column of nth field, it is the pixel to be interpolated presently.

In addition, P$_{AI}$ (i,j,n) and P$_{BI}$ (i,j,n) describe a value interpolated in accordance with the direction indicating the minimum region matching error in the A region and B region.

Accordingly, as described above, the spatial interpolator 34 performs the interpolation by using the pixels spatially adjacent to the pixel to be interpolated presently.

In addition, when the interpolation is performed by using the pixels separated far away relatively, the spatial interpolator 34 can perform more accurate and stable interpolation by interpolating with the pixels when the correlation is high after searching the correlation of the pixels adjacent to the pixel to be interpolated.

Herein, the spatial interpolator 34 uses first the direction detecting method on the basis of the gradient and rule, and uses the region matching method after in order to determine the pixel value to be interpolated.

First, the operation theory of the region matching method is simple, however it is difficult to detect the interpolation value accurately because there is lots of computing quantity for detecting one edge direction.

On the contrary, the direction detecting method based on the gradient and rule can detect the edge direction easily with simple operation, however it is difficult to detect the edge direction accurately.

Accordingly, the present invention uses the merits of the both methods, the region matching method is used when the linear interpolation value of the edge direction detected pixel is extracted, and the edge direction detecting method based on the gradient and rule is used when the edge direction comprising the pixel to be interpolated is detected.

According to this, the present invention can provide more efficient edge detecting method by reducing the computing quantity on the comparison with a case adapting only the region matching method, and can provide more accurate edge direction detecting on the comparison with a case adapting the edge direction detecting method based on the gradient and rule.

Meanwhile, when the maximum value (max (a,b,c)) of the difference value (a,b,c) between the pixels is the same as or bigger than a certain threshold, the spatial interpolator 34 detects the edge direction by using the region matching method. It will now be described in more detail with reference to accompanying FIG. 12.

Figure 12:
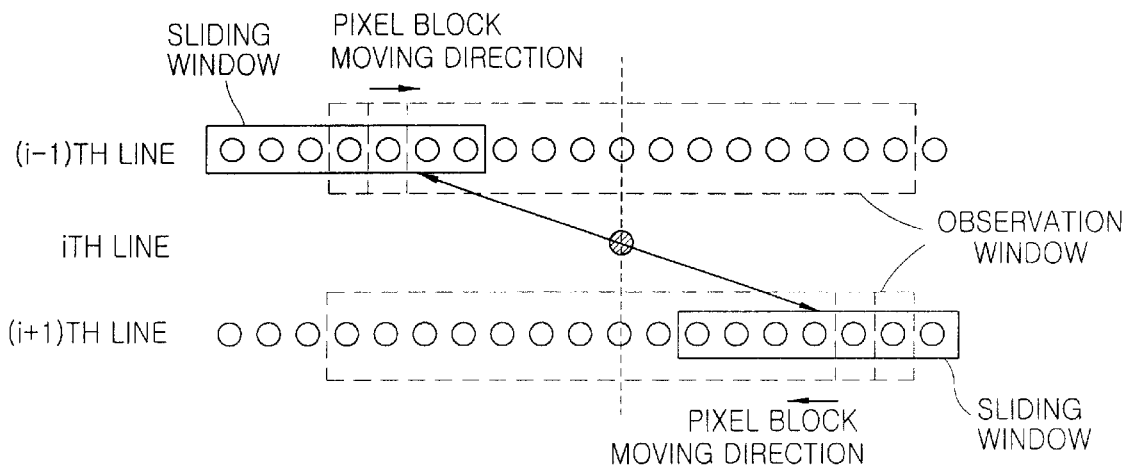
FIG. 12 illustrates a region matching method for detecting an interpolation direction in accordance with an embodiment of the present invention.

FIG. 12 illustrates the region matching method for detecting an interpolation direction in accordance with an embodiment of the present invention. In other words, the edge direction determination by the region matching method is described.

As depicted in FIG. 12, the observation window is set 15 pixels to the horizontal direction, and the sliding window is set 1×7 pixel region.

First, a certain sliding window is set on i+1th line and i−1th line in a certain observation window centering around the ith line to be interpolated.

After that, the sliding window of the i−1th line is moved into right, and the sliding window on the i+1th line is moved right to left.

Herein, it is assumed the sliding region is moved with ¼ pixel degree.

According to this, when detecting the difference value of the pixels placed on the diagonal line of each other on each sliding displacement in the sliding window, the region matching error (Err$_d$) of the pixel value is yielded by calculating the difference value as below Equation 8.

$$Err_d = \frac{1}{7} \sum_{k=-3+d}^{3+d} |P(i-1, j+k, n) - P(i+1, j+k-2d, n)| \qquad \text{[Equation 8]}$$

Herein, d means the edge direction.

Accordingly, the relation between the edge direction (d) and observation window (W$_0$) can be described as below Equation 9, and the relation between the edge direction (d) and moving interval (Δx) can be described as below Equation 10. In other words, when the pixel block of the sliding window slides with ¼ pixel degree, the sliding interval (Δx) is ¼.

$$-\frac{(W_0 - 1)}{2} \leq d \leq \frac{(W_0 - 1)}{2} \qquad \text{[Equation 9]}$$

$$d_{i+1} - d_i = \Delta x \qquad \text{[Equation 10]}$$

$$d_{i+1} - d_i = \Delta x \qquad \text{[Equation 10]}$$

Herein, when the range of the edge to be detected is wide, the observation window is expanded, and in order to heighten the detecting accuracy of the edge direction and interpolation accuracy, the moving degree of the pixel block in the sliding window is reduced.

In other words, the volume of the observation window and sliding window can be adjusted freely in accordance with the application. And, the number of the pixels comprised in the observation window and sliding window can be adjusted freely also.

However, in the present invention, when the region matching method is adapted in detail according to the given edge direction, the region matching method is adapted to each region after dividing the observation window into a plurality of regions.

Herein, the region matching method is adapted to each region by dividing the observation window into the plurality of regions.

According to this, the minimum region matching error (Min_err) of each region is found, and the pixel value of the pixel to be interpolated is interpolated in accordance with the direction indicating the minimum region matching error among the minimum matching errors. It will now be described in detail with reference to accompanying FIG. 13.

Figure 13:
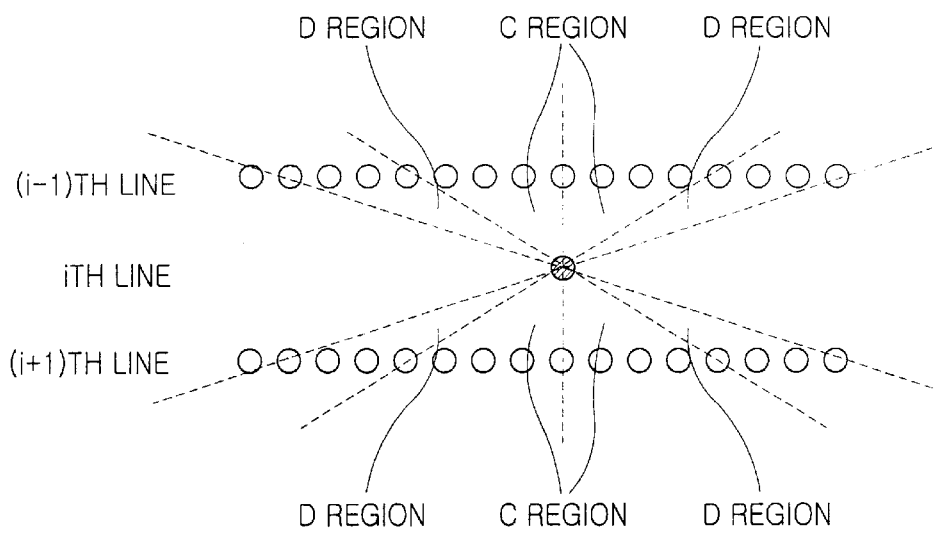
FIG. 13 illustrates an observation window division, for the region matching method in accordance with an embodiment of the present invention.

FIG. 13 illustrates the observation window division for the region matching method in accordance with an embodiment of the present invention.

As depicted in FIG. 13, when the region is divided into C, D regions, the interpolation process for interpolating the pixel value of the pixel to be interpolated will now be described in detail.

First, the C region is set to a certain degree boundary by considering the volume of the sliding window to the left and right direction centering around the edge direction 0°, and the D region is set from the boundary of the C region to the end of the left and right observation window.

Herein, the region matching errors are found about each C and D region with Equation 8, the region matching errors about each C, D region are compared, and accordingly the minimum region matching error Min_Err$_C$, Min_Err$_D$ in the C, D region are found.

After that, the minimum matching error Min_Err$_C$, Min_Err$_D$ in the C, D region are compared.

Herein, when the region matching error Min_Err$_C$ is smaller than or same as the region matching error Min_Err$_D$, the pixel value to be interpolated is a value interpolated in accordance with the direction indicating Min Err$_D$ of the region matching error of the C region.

On the contrary, when the region matching error Min_Err$_C$ is bigger than the region matching error Min_Err$_D$, the pixel value interpolated in accordance with the direction indicating Min_Err$_D$ of the region matching error of the C region is found, and it is judged whether there is the found value between the pixel values existed on upper and lower of the pixel to be interpolated.

According to this, when there is the pixel value interpolated in accordance with the direction indicating the region matching error Min_Err$_D$ between the pixel values existing on the upper and lower of the pixel to be interpolated, the pixel value is the pixel value to be interpolated.

Meanwhile, when there is no pixel value interpolated in accordance with the direction indicating the region matching error Min_Err$_D$ between the pixel values existing on the upper and lower of the pixel to be interpolated, the pixel value to be interpolated is a value interpolated in accordance with the direction indicating the region matching error Min_Err$_C$ of the C region.

In other words, the above-described process is performed in accordance with a below program.

IF(Min_Err$_C$ ≦ Min_Err$_D$) THEN
   P$_I$ (i, j, n)=P$_{CI}$ (i, j, n)
ELSE
   IF (Median{P(i−1, j, n), P$_{DI}$ (i, j, n), P (i+1, j, n)}=P$_{DI}$ (i, j, n)) THEN
     P$_I$ (i, j, n)=P$_{DI}$ (i, j, n)
   ELSE
     P$_I$ (i, j, n)=P$_{CI}$ (i, j, n)
   ENDIF
ENDIF Herein, P$_I$ (i, j, n) illustrates a pixel on i row and j column of the nth field, and it is the pixel to be interpolated.

And, P$_{CI}$ (i,j,n) and P$_{DI}$ (i,j,n) mean the value interpolated in accordance with the direction indicating the minimum region matching error of the C region and D region.

In addition, in order to find the interpolation pixel in the C, D regions, the pixel value linearly interpolated in accordance with the direction indicating the minimum region matching error can be used as described above, however a pixel value interpolated as below can be used also in order to perform more stable interpolation.

The operation can be processed by a below process.

IF (Err$_0$=0) THEN $$P_{CI}(i, j, n) = \frac{P(i-1, j, n) + P(i+1, j, n)}{2}$$

ELSE $$P_{CI}(i, j, n) = \left(\frac{\text{Min\_Err}_C}{Err_0}\right) \cdot \left(\frac{P(i-1, j, n) + P(i+1, j, n)}{2} + \left(1 - \frac{\text{Min\_Err}_C}{Err_0}\right) \cdot (Pc_{\_min}(i, j, n))\right)$$

ENDIF
IF (Min_Err$_D$ ≧ Err$_0$) THEN
   P$_I$ (i, j, n)=P$_{CI}$ (i, j, n), in other words, there is no need to find P$_{DI}$ (i, j, n).
ELSE $$P_{DI}(i, j, n) = \left(\frac{\text{Min\_Err}_D}{Err_0}\right) \cdot \left(\frac{P(i-1, j, n) + P(i+1, j, n)}{2} + \left(1 - \frac{\text{Min\_Err}_D}{Err_0}\right) \cdot (P_{D\_min}(i, j, n))\right)$$

ENIDF

Herein, Err$_0$ means the region matching error to the vertical direction, P$_{C\_min}$(i,j,n) in the pixel value interpolated linearly in accordance with the direction indicating the minimum region matching error in the C region, P$_{D\_min}$(i, j,n) is the pixel value interpolated linearly in accordance with the direction indicating the minimum region matching error in the D region.

In other words, when the minimum matching error Err$_0$ value to the vertical direction is approximate value of '0', the interpolation value P$_{CI}$ (i, j, n) is found. When the region matching error Err$_0$ to the vertical direction is not the approximate value of '0', the interpolation value P$_{CI}$ (i, j, n) is found in accordance with the direction indicating the minimum region matching error Min_Err$_C$ of the D region by giving weighting factor.

And, it is compared whether the minimum region matching error Min_Err$_D$ of the D region is bigger than the region matching error Err$_0$ to the vertical direction.

According to this, when the minimum region matching error (Min_Err$_D$) value of the D region is bigger than the region matching error Err$_O$, it is P$_I$ (i, j, n)=P$_{CI}$ (i, j, n), accordingly there is no need to find the interpolation value P$_{DI}$ (i, j, n).

On the contrary, when the minimum region matching error (Min_Err$_D$) value of the D region is smaller than the region matching error Err$_O$, the interpolation value P$_{CI}$ (i, j, n) is found in accordance with the direction indicating the minimum region matching error Min_Err$_D$ of the D region.

Accordingly, as described above, the spatial interpolator 34 performs the interpolation by using the pixels spatially adjacent to the pixel to be interpolated as much as possible.

In addition, when the interpolation is performed by using the pixels placed relatively far away, the spatial interpolator 34 can perform more accurate and stable interpolation by using the pixels only when the correlation is high by checking the correlation between the pixels adjacent to the pixel to be interpolated.

After that, the median filtering is performed about the perimeter pixels of the pixel to be interpolated, in particular, the two pixels placed on a diagonal line used in the linear interpolation, the pixel on the interpolated position, and the two pixels on the interpolated position of the former field and after field. It will now be described with reference to accompanying FIG. 14.

Figure 14:
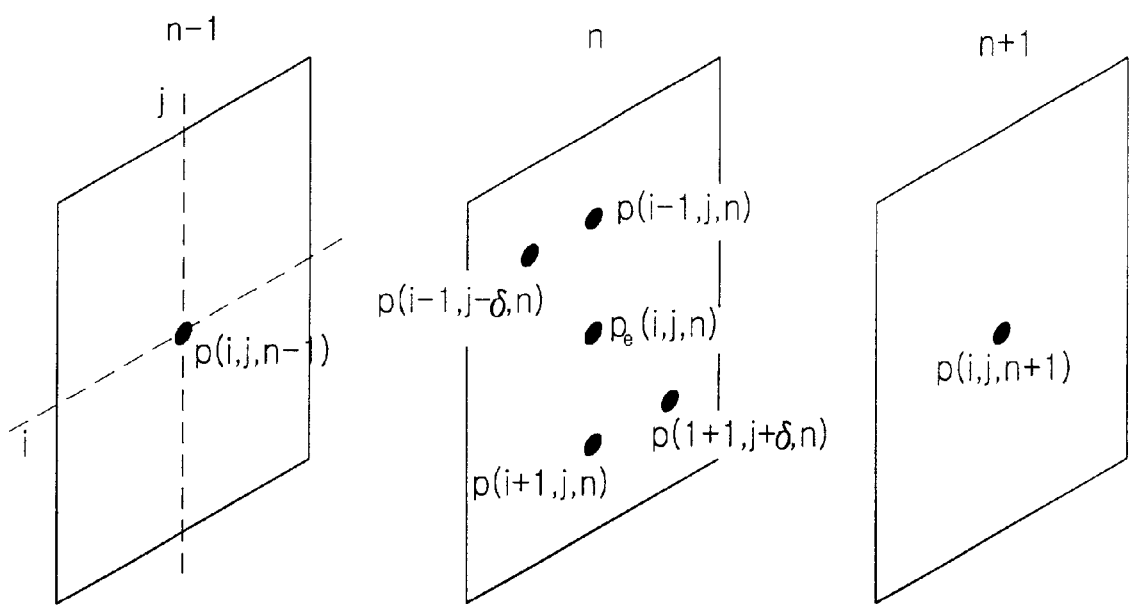
FIG. 14 illustrates pixels and field data used for a median filtering in accordance with an embodiment of the present invention.

FIG. 14 illustrates pixels and field data used for a median filtering in accordance with an embodiment of the present invention. In other words, it illustrates the adjacent pixels used in the temporal and spatial filtering for the interpolation pixel determination.

As described in FIG. 14, the noise element of the pixel is removed by performing the median filtering with a below Equation 11 about the adjacent pixel of the pixel to be interpolated in the present field (nth field), in particular, the two pixels 1, 2 placed on a diagonal line used in the linear interpolation, pixel 3 on the interpolated position, two pixels 4, 5 on the interpolated position of the former field and after field.

$$P'_e(i, j, n) = \text{Median}\{P(i, j, n-1), P(i-1, j-\delta, n),$$
$$\frac{P(i-1, j-\delta, n) + P(i+1, j+\delta, n))}{2},$$
$$P(i+1, j+\delta, n), P(i, j, n+1)\}$$

[Equation 11]

Accordingly, the noise element can be removed by filtering the pixel to be interpolated timely and spatially by performing the median filtering such as Equation 11.

In addition, the expander 33 can have timely interpolation effect of a still portion of the picture considered as the moving picture by performing the median filtering such as Equation 11. The stability can be improved by maintaining the consistency to the time axial.

And, in order to yield the more and stable interpolation value on the present field (nth field), the median filtering such as a below Equation 12 can be performed by giving a certain weighting factor to the intra-filed interpolated pixel value in accordance with the yielded edge direction. In other words, the median filtering considering the weighting factor is performed as below Equation 12.

$$P'_e(i, j, n) = \text{Median}\{P(i, j, n-1), P(i-1, j-\delta, n),$$
$$\frac{(P(i-1, j-\delta, n) + P(i+1, j+\delta, n))}{2},$$
$$\frac{(P(i-1, j-\delta, n) + P(i+1, j+\delta, n))}{2},$$
$$P(i+1, j+\delta, n), P(i, j, n+1)\}$$

[Equation 12]

However, when the median filtered interpolation pixel P'$_e$(i,j,n) is determined by the pixels spatially far away from the pixel to be interpolated or it exists on the very quick motion, it can have a value largely differentiated from the other pixels adjacent to the interpolation pixel value.

In order to prevent the phenomenon, the spatial interpolator 34 performs the vertical direction median filtering by a below program by referring to the pixels adjacent to the vertical direction from the pixel to be interpolated on the field.

IF($|\delta|$<m) THEN
   P$_e$(i,j,n)=P'$_e$(i,j,n)
ELSE
   P$_e$(i,j,n)=Median{P(i−1,j,n), P'$_e$(i,j,n),P(i+1,j,n)}
ENDIF The operation of the above-mentioned vertical direction median filtering will now be described in detail.

First, when the distance horizontally separated from the position of the pixel to be interpolated is smaller than a determined m value, the interpolation pixel assumed by the Equation 11 or 12 is determined as the interpolation value.

However, when the distance horizontally separated from the position of the pixel to be interpolated is not smaller than a determined m value, the interpolation value is determined as the median filtered value by referring to the interpolation pixel assumed by the Equation 11 or 12 and the pixel value of the pixels vertically adjacent to the interpolation pixel.

When the assumed interpolation pixel P'$_e$(i,j,n) is determined by the intra-field pixels largely spatially separated from the position to be interpolated or exists on the very quick motion, in order to prevent the interpolation pixel value is boosted as a value largely differentiated from the adjacent intra-field pixels, the interpolation pixel performs the median filtering with the vertically adjacent intra-field pixels.

And, the temporal interpolator 37 extracts the field average value by averaging the pixel value of the former field data and pixel value of the after field data corresponding to the position same as the pixel to be interpolated.

For example, when the jth pixel on the ith line has to be interpolated in order to generate the nth field picture newly, the temporal interpolator 37 extracts the field average value by averaging the pixel value of the n-1th field data and the pixel value of the n+1th field data having the picture data of the ith pixel on the ith line.

In other words, the field average value on the temporal interpolator 37 can be yielded by a below Equation 13.

$$P_t(i, j, n) = \frac{P(i, j, n-1) + P(i, j, n+1)}{2}$$

[Equation 13]

Herein, the soft switch 35 receives the BD and BPPD yielded from the motion determining unit 31, references the motion degree value outputted from the expander 33, mixes the intra-field interpolation value considering the edge direction outputted from the spatial interpolator 34 and the field average value outputted from the temporal interpolator 37, and outputs it.

The soft switch 35 outputs the operation value as below Equation 14.

$$P(i, j, n) = \alpha P_e(i, j, n) + (1 - \alpha)\frac{P(i, j, n-1) + P(i, j, n+1)}{2} \quad \text{[Equation 14]}$$

Herein, α means the motion degree value outputted from the expander 33, and it is a value within the range of '0≦motion degree value<1'.

After that, the vertical converter 36 converts the number of vertical lines of the present field picture in order to generate the interpolation line corresponding to a display apparatus by referring to the present field data values stored on the field storing unit 30.

On the contrary, when the deinterlaced frame data is needed without requiring the line conversion, the vertical converter 36 passes the value outputted from the field storing unit 30 and soft switch 35, and outputs it.

As described above, the deinterlacing apparatus and the method thereof in accordance with the present invention are capable of improving the image quality of the picture by performing an appropriate interpolation in accordance with the motion degree and edge direction of the field to be interpolated.

In addition, the deinterlacing apparatus and the method thereof in accordance with the present invention are capable of reducing the manufacture cost of a circuit by simplifying the circuit.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A deinterlacing apparatus, comprising:
  a motion determining unit for mapping field data in a field region to be interpolated and perimeter field data around the field region and detecting a brightness difference (BD) and a brightness profile pattern difference (BPPD);
  a temporal interpolator for yielding a field average value about a field picture to be interpolated by averaging a pixel value of the former field and a pixel value of the after field;
  a spatial interpolator for detecting an edge direction comprised in the perimeter pixel values with inputs of the pixel value of the former field and after field about the field picture to be interpolated, detecting a direction indicating a minimum region matching error in accordance with the detected edge direction, and yielding an intra-field interpolation value in accordance with the detected direction; and
  a switch unit for mixing the yielded intra-field interpolation value and the yielded field average value in accordance with the BD and BPPD, and outputting the mixed value.

2. The deinterlacing apparatus according to claim 1, wherein the spatial interpolator performs a sub-sampling of a certain region centering around the pixel to be interpolated when the detected edge direction does not exist on a horizontal or a vertical edge, detects an edge direction according to a gradient when the pixel to be interpolated does, not exist on the horizontal or vertical edge of the region where the sub-sampling is performed, divides a certain set observation window into a numbers of sub-regions centering around the detected edge direction, detects a minimum region matching error of each sub-region, and yields an intra-field interpolation value according to a direction indicating the detected minimum region matching error.

3. The deinterlacing apparatus according to claim 2, wherein the direction indicating the detected minimum region matching error is most adjacent to 0°.

4. A deinterlacing method for interpolating present field data, comprising:
  a sub-sampling process for performing a sub-sampling of perimeter pixels in a certain region centering around a pixel to be interpolated when the pixel to be interpolated does not exist on a horizontal or a vertical edge;
  a detecting process for detecting a varying direction of the pixel to be interpolated in the certain region where the sub-sampling is performed; and
  a yielding process for yielding an interpolation value by referring to the detected direction,
  wherein the yielding process for yielding the interpolation value includes:
    a dividing step for dividing the certain region into a first and a second regions centering around the varying direction of the pixel to be interpolated, and
    a yielding step for yielding the interpolation value in accordance with an error direction.

5. The deinterlacing method according to claim 4, wherein the sub-sampling process comprises:
  a sub-sampling step for performing a sub-sampling of a certain perimeter region centering around the pixel to be interpolated;
  a correlation finding step for finding a correlation between the pixel to be interpolated and one of the perimeter pixels;
  a judging step for judging whether the pixel to be interpolated exists on the vertical or horizontal edge by referring to the correlation;
  a yielding step for yielding a gradient of an edge portion when the pixel to be interpolated does not exist on the vertical or horizontal edge;
  a discriminating step for discriminating the varying direction of the pixel to be interpolated by referring to the yielded gradient; and
  a sub-sampling step for performing the sub-sampling of a certain region pixel of an upper and lower line centering around the pixel to be interpolated when the discriminated direction is 0°.

6. The deinterlacing method according to claim 5, wherein the yielding step for yielding the gradient performs in advance a two-dimension gaussian filtering about a value linearly interpolated to the vertical direction.

7. The deinterlacing method according to claim 4, wherein the sub-sampling process performs a low-pass filtering in advance in order to limit a frequency wide-band before the sub-sampling.

8. The deinterlacing method according to claim 4, wherein the detecting process comprises:
  a correlation finding step for finding a correlation between the pixel to be interpolated and a perimeter pixel in the region where the sub-sampling is performed;
  a judging step for judging whether the pixel to be interpolated exists on the vertical or horizontal edge by referring to the correlation;
  a judging step for judging the edge direction as 0° when the pixel to be interpolated exists on the vertical or horizontal edge;

a yielding step for yielding a gradient of an edge portion when the pixel to be interpolated does not exist on the vertical or horizontal edge; and a discriminating step for discriminating the varying direction of the pixel to be interpolated by referring to the gradient.

9. The deinterlacing method according to claim 4, wherein the yielding step yield the interpolation value in accordance with an error direction by finding an error about the varying direction of the pixel to be interpolated about the divided first and second regions.

10. The deinterlacing method according to claim 9, wherein the first region is set to an edge direction detected by the gradient centering around the edge direction of 0°.

11. The deinterlacing method according to claim 9, wherein the second region is set from a detected edge direction to the end of a region to be observed.

12. The deinterlacing method according to claim 9, wherein the yielding step for yielding the interpolation value in accordance with the error direction comprises:

a comparing step for finding a region matching error of the first and second regions and comparing the found region matching errors;

a yielding step for yielding a linearly interpolated value to a direction indicating a minimum region matching error of the first region when the region matching error of the first region is equal to or smaller than a region matching error of the second region;

a comparing step for linearly-interpolating the region matching error of the first region to a direction indicating a minimum region matching error of the second region when the region matching error of the first region is larger than the region matching error of the second region, and comparing the interpolation value is between the pixel values existed on an upper and lower of the pixel to be interpolated; and a yielding step for yielding the linearly interpolated value to a direction indicating the minimum region matching error of the second region when the pixel value linearly interpolated to the direction indicating the minimum region matching error of the second region is between the pixel values existed on the upper and lower of the pixel to be interpolated.

13. The deinterlacing method according to claim 12, wherein the deinterlacing method further comprises a yielding step for yielding the linearly interpolated value to a direction indicating the minimum region matching error of the first region when the pixel value linearly interpolated to the direction indicating the minimum region matching error of the second region does not exist between the pixel values existing on the upper and lower of the pixel to be interpolated.

14. A deinterlacing method for detecting a motion degree by using a brightness difference and a brightness profile pattern difference of a picture in order to interpolate the picture by referring to the motion degree, comprising:

a pixel detecting process for detecting pixels in a certain region including a pixel to be interpolated in a number of field data corresponding to an interlaced scanning type picture;

a varying direction detecting process for detecting a varying direction of the pixel to be interpolated by yielding a correlation between the pixels in the certain region;

a yielding process for yielding a region matching error of each region after dividing an observation window when the pixel to be interpolated does not exist on a horizontal or vertical edge in the certain region; and a yielding process for yielding an interpolation value to a direction indicating a minimum region matching error among the yielded errors of each region.

15. The deinterlacing method according to claim 14, wherein the yielding process for yielding the region matching error comprises:

a setting step for setting an observation window to left and right centering around the varying direction of the pixel as 0° and setting a sliding window;

a dividing step for dividing the set observation window into a first region and a second region;

a yielding step for yielding a region matching error about each of the divided regions; and a yielding step for yielding a minimum region matching error in each yielded region matching error.

16. The deinterlacing method according to claim 15, wherein the fist and second regions are divided centering around an the edge direction of 0°.

17. The deinterlacing method according to claim 16, wherein the first region is set to a boundary comprising the sliding window to left and right centering around the edge direction of 0°.

18. The deinterlacing method according to claim 16, wherein the second region is set from the boundary of the fist region to the left and right end of the observation window.

19. The deinterlacing method according to claim 15, wherein the yielding process t for yielding the interpolation value comprises:

a comparing step for comparing the yielded minimum region matching error of the first and second regions;

a yielding step for yielding the interpolated value to the direction indicating the minimum region matching error of the first region when the minimum region matching error of the first region is equal to or smaller than the minimum region matching error of the second region;

a comparing step for comparing whether there is a value interpolated to the direction indicating the minimum region matching error of the second region between the pixel values existing on an upper and lower of the pixel to be interpolated when the minimum region matching error of the first region is bigger than the minimum region matching error of the second region; and a yielding step for yielding the interpolated value to the direction indicating the minimum region matching error of the second region when the value interpolated to the direction indicating the minimum -region matching error of the second region is between the pixel values existing on the upper and lower of the pixel to be interpolated.

20. The deinterlacing method according to claim 19, wherein the deinterlacing method further comprises a yielding step for yielding the value interpolated to the direction indicating the minimum region matching error of the second region when the value interpolated to the direction indicating the minimum region matching error of the second region does not exist between the pixel values existing on the upper and lower of the pixel to be interpolated.

21. The deinterlacing method according to claim 20, wherein the yielding process for yielding the interpolation value is performed linearly.

22. The deinterlacing method according to claim 14, wherein the yielding process for yielding the interpolation value comprises:

a first step for comparing a region matching error of first and second regions;

a yielding step for yielding a value linearly interpolated to a direction indicating the minimum region matching error of the first region when the minimum region matching error of the first region is equal to or smaller than the minimum region matching error of the second region;

a comparing step for comparing whether the minimum region matching error of the second region is bigger than the region matching error to a vertical direction when the minimum region matching error of the first region is bigger than the minimum region matching error of the second region;

a yielding step for yielding a value linearly interpolated to a direction indicating the minimum region matching error of the second region by considering a weighting factor when the minimum region matching error of the second region is bigger than the region matching error to the vertical direction; and a yielding step for yielding a value linearly interpolated to a direction indicating the minimum region matching error of the first region when the minimum region matching error of the second region is equal to or smaller than the region matching error to the vertical direction.

23. A deinterlacing apparatus for interpolating present field data, comprising:

sub-sampling means for performing a sub-sampling of perimeter pixels in a certain region centering around a pixel to be interpolated when the pixel to be interpolated does not exist on a horizontal or a vertical edge;

detecting means for detecting a varying direction of the pixel to be interpolated in the certain region where the sub-sampling is performed; and yielding means for yielding an interpolation value by referring to the detected direction, wherein the yielding means for yielding the interpolation value includes:

dividing means for dividing the certain region into a first and a second regions centering around the varying direction of the pixel to be interpolated; and yielding means for yielding the interpolation value in accordance with an error direction.

* * * * *